Sept. 6, 1949.　　　　F. H. PIETZSCH　　　　2,480,958
FORKED CONNECTOR AND ROD ASSEMBLY
Filed July 3, 1946

INVENTOR
Frank H. Pietzsch
by E. E. Huffman
atty.

Patented Sept. 6, 1949

2,480,958

UNITED STATES PATENT OFFICE 2,480,958

FORKED CONNECTOR AND ROD ASSEMBLY

Frank H. Pietzsch, St. Louis, Mo., assignor to Western Railway Equipment Company, St. Louis, Mo., a corporation of Missouri Application July 3, 1946, Serial No. 681,392

6 Claims. (Cl. 287—20.2)

My invention relates to an assembly of a rod and forked connector and method of forming same, one specific application being to the production of a rod and jaw assembly for connection of brake levers for transmission of braking force in railway cars and street cars.

An important object of the invention is to provide a method and means whereby what is commonly referred to as a "brake rod jaw" can be applied and properly secured to a brake rod without any previous deformation or preparation of the rod end, and which jaw is initially composed of two separate and identical parts provided with inter-engaging locating means determining that the brake pin eyes will have proper relative position after the parts are secured to the rod.

My invention permits forming the jaw of forged material and the formation of an assembly having as great load transmitting capacity as if the jaw and rod were formed of a single piece of material. It also provides a method and means for accurate formation of brake rod and jaw assemblies in the field and without special equipment, the brake jaw parts being readily applicable to rod sections cut from commercial rolled steel rod without any preliminary working of the end of the rod which is to form part of the joint.

Figure 1:
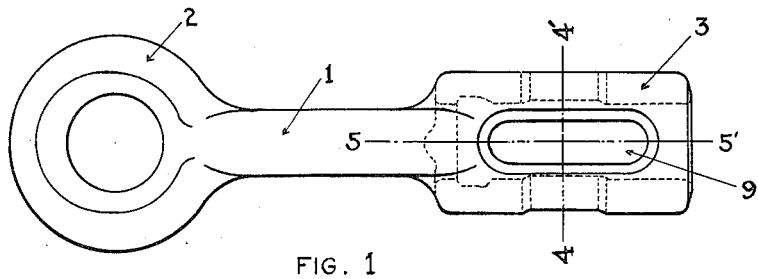
Figure 2:
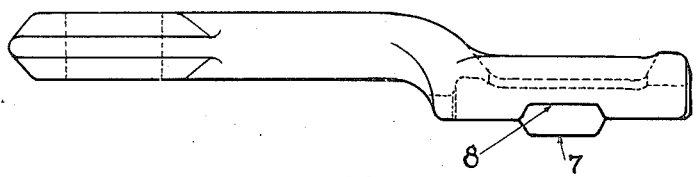
Figure 3:
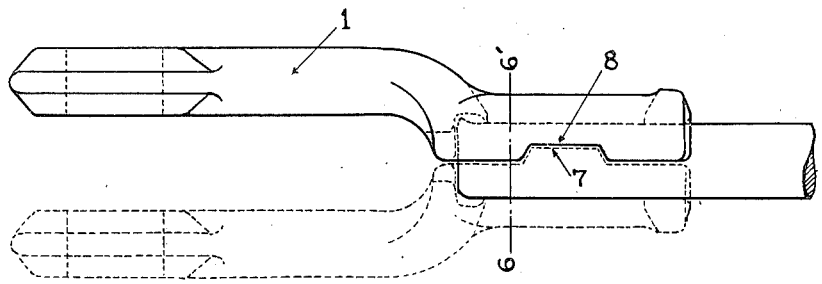
Figure 4:
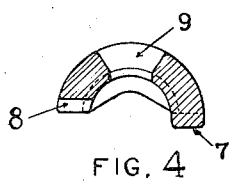
Figure 6:
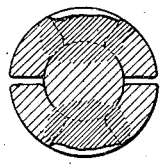
Figure 5:
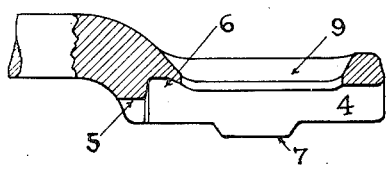

In the accompanying drawings illustrating my invention Figure 1 is a side elevational view of one of the duplicate jaw parts; Figure 2 is also a side elevational view from a position 90° displaced from the position indicated in Figure 1; Figure 3 illustrates the jaw parts in position on the brake rod, one of said parts being shown in dotted lines; Figure 4 is a cross section on the line 4—4 of Figure 1; Figure 5 is a cross section on the line 5—5 of Figure 1; and Figure 6 is a sectional view of a completed brake rod and jaw assembly, the section being taken in the position approximately that of line 6—6' shown in Figure 3.

The brake rod jaw consists of two identical forged parts 1, each provided with brake pin receiving eye portions 2 and with a shank portion including the rod engaging part 3. This last mentioned part is provided with a semi-circular longitudinally extending recess 4 to receive a peripheral part of the straight end of a brake rod and with an abutment portion 5 engageable by the end face of the rod. Between the end of the main rod receiving recess 4 and the abutment is a deeper semi-cylindrical recess 6 into which any fin formed by the operation of shearing the brake rod section from a length of stock rod (such a fin being shown in somewhat exaggerated size in Figure 3) may extend, the purpose being to permit close contact between the peripheral surface of the rod and the surface of the recess 4 when the jaw shank is applied to the rod without the necessity of any machining of the rod to remove such fins or other slight deformations of the rod material adjacent the end of the rod and which project beyond the periphery of the body of the rod.

Each shank portion 3 is provided at one of its edges with a projecting lug 7 and at the other with a recessed or notched portion 8 to cooperate with recess 8 and lug 7 respectively on the other identical shank part to form a locating means determining the relative longitudinal position of the brake rod receiving eyes of the jaw parts. Each shank portion is also provided with an opening 9 therethrough for the reception of a welding electrode.

In forming a brake rod and jaw assembly the jaw part 1 is applied to the end of the brake rod in the position indicated in Figure 3 by simply being manually held in this position by one hand of the operator while with the other he applies a welding electrode to the rod and side walls of the shank opening 9 until a suitable weld has been formed. The material supplied by the welding rod and the area of metal made substantially integral by the welding process, is indicated by the darker shaded area at the upper part of Figure 6. After this welding is completed the other duplicate part is applied to the rod in the position indicated by the dotted lines in Figure 3, and this part is also welded to the rod in the manner just described.

It will be observed that by my invention a strong secure rod and jaw assembly with the brake pin eyes having the proper relative location may be formed without the aid of any fixtures or tools and at minimum cost of labor and material.

Having fully described my invention, that which I claim as novel and desire to protect by Letters Patent of the United States is:

1. A forked connector having a forked pin receiving portion at one end and a tubular rod receiving shank portion at the other end, said connector comprising two duplicate parts each having an end portion adapted to form one branch of said forked portion and a longitudinally recessed end portion adapted to form one longitudinal half of said shank portion, the longitudinal recess of each of said duplicate parts being formed adjacent to its inner end with a second deeper recess adapted to accommodate an enlarged inner end portion of said rod and at said inner end with a third shallower recess adapted to form an abutment for said enlarged inner end of said rod.

2. The combination set forth in claim 1, wherein said longitudinally recessed portion is formed intermediate between the ends thereof with a lug on one side and a notch on the other side shaped in conformity with said lug, the lug of each longitudinally recessed portion being adapted to fit within the notch of the other longitudinally recessed portion.

3. The combination set forth in claim 2, wherein each of said longitudinally recessed portions has a complete longitudinal opening extending laterally therethrough between the lug and notch thereof adapted to receive a welding material for securing said tubular shank portion to said rod.

4. A forked connector and rod assembly comprising a connector having a forked pin receiving portion at one end and a tubular shank portion at the other end and a rod having a straight portion extending into said tubular shank portion and having an enlarged inner end, said connector comprising two duplicate parts each having an end portion adapted to form one branch of said forked portion and a longitudinally recessed portion adapted to form one longitudinal half of said shank portion, the longitudinal recess of each of said duplicate parts being formed adjacent to its inner end with a second deeper recess adapted to clear the enlarged inner end portion of said rod and at said inner end with a third shallower recess adapted to form an abutment for said enlarged inner end of said rod.

5. The combination set forth in claim 4 wherein said longitudinally recessed portion is formed intermediate between the ends thereof with a lug on one side and a notch on the other side shaped in conformity with said lug, the lug of each longitudinally recessed portion being adapted to fit within the notch of the other longitudinally recessed portion.

6. The combination set forth in claim 5 wherein each of said longitudinally recessed portions has a complete longitudinal opening extending laterally therethrough between the lug and notch thereof, and a welding material is deposited in said opening in contact with the continuous edge thereof and the portion of the rod exposed thereby.

FRANK H. PIETZSCH.

REFERENCES CITED

The following references are of record in the file of this patent:

UNITED STATES PATENTS

| Number | Name | Date |
| --- | --- | --- |
| 930,162 | Dulinsky | Aug. 3, 1909 |
| 1,824,821 | Koopmans | Sept. 29, 1931 |
| 1,933,564 | Neff | Nov. 7, 1933 |
| 2,050,553 | Barney et al. | Aug. 11, 1936 |
| 2,067,282 | Padgett | Jan. 12, 1937 |